US012046812B2

(12) United States Patent
Li et al.

(10) Patent No.: US 12,046,812 B2
(45) Date of Patent: Jul. 23, 2024

(54) ANTENNA ASSEMBLY AND MOBILE TERMINAL

(71) Applicant: Honor Device Co., Ltd., Shenzhen (CN)

(72) Inventors: Yuanpeng Li, Shenzhen (CN); Lanchao Zhang, Shenzhen (CN); Jian Luo, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 314 days.

(21) Appl. No.: 17/607,331

(22) PCT Filed: Apr. 22, 2020

(86) PCT No.: PCT/CN2020/086038
§ 371 (c)(1),
(2) Date: Oct. 28, 2021

(87) PCT Pub. No.: WO2020/221075
PCT Pub. Date: Nov. 15, 2020

(65) Prior Publication Data

US 2022/0209403 A1 Jun. 30, 2022

(30) Foreign Application Priority Data

Apr. 30, 2019 (CN) ......................... 201910360018.5

(51) Int. Cl.
*H01Q 1/52* (2006.01)
*H01Q 1/24* (2006.01)
(Continued)

(52) U.S. Cl.
CPC ............. *H01Q 1/521* (2013.01); *H01Q 1/243* (2013.01); *H01Q 5/307* (2015.01); *H01Q 9/045* (2013.01); *H01Q 21/28* (2013.01)

(58) Field of Classification Search
CPC ........ H01Q 1/521; H01Q 5/307; H01Q 1/243; H01Q 9/045; H01Q 21/28
See application file for complete search history.

(56) References Cited

U.S. PATENT DOCUMENTS 7,336,229 B1 * 2/2008 Tseng ..................... H01Q 5/378 343/702
8,620,244 B2 * 12/2013 Roeckl ................. H04B 1/0053 455/306

(Continued)

FOREIGN PATENT DOCUMENTS

CN 104103888 A 10/2014
CN 104953289 A 9/2015

(Continued)

*Primary Examiner* — Graham P Smith
*Assistant Examiner* — Jordan E. DeWitt
(74) *Attorney, Agent, or Firm* — Leydig, Voit & Mayer, Ltd.

(57) ABSTRACT

This application provides an antenna assembly. The antenna assembly includes at least a first antenna and a second antenna. The first antenna includes a first feed point and a first radiator connected thereto. The second antenna includes a second feed point and a second radiator connected thereto. There is a gap between the first radiator and the second radiator. An end of the second radiator close to the gap is provided with a first ground wire shared by the first antenna and the second antenna. An end of the second radiator away from the gap is provided with a second ground wire. Because currents excited by the first antenna and the second antenna are orthogonally complementary, crosstalk does not occur between the ground currents of the first antenna and the second antenna.

21 Claims, 8 Drawing Sheets

(51) Int. Cl.

| | |
|---|---|
| ***H01Q 5/307*** | (2015.01) |
| ***H01Q 9/04*** | (2006.01) |
| ***H01Q 21/28*** | (2006.01) |

(56) References Cited

U.S. PATENT DOCUMENTS

| | | | | |
|---|---|---|---|---|
| 9,762,710 | B2 * | 9/2017 | Lee | H01Q 1/48 |
| 9,935,359 | B2 | 4/2018 | Kim et al. | |
| 10,015,294 | B2 | 7/2018 | Lee et al. | |
| 10,236,558 | B2 * | 3/2019 | Mai | H01Q 5/50 |
| 11,283,154 | B2 * | 3/2022 | Wen | H01Q 13/10 |
| 11,532,871 | B2 * | 12/2022 | Zhou | H01Q 1/243 |
| 2007/0024503 | A1 * | 2/2007 | Tsai | H01Q 1/38 343/795 |
| 2010/0053020 | A1 * | 3/2010 | Koyanagi | H01Q 5/378 343/876 |
| 2010/0271264 | A1 * | 10/2010 | Li | H01Q 7/00 343/700 MS |
| 2011/0241950 | A1 * | 10/2011 | Milosavljevic | H01Q 5/00 343/702 |
| 2012/0262343 | A1 * | 10/2012 | Radojkovic | H01Q 5/20 343/702 |
| 2013/0162486 | A1 * | 6/2013 | Korva | H01Q 21/30 343/725 |
| 2013/0285867 | A1 * | 10/2013 | Wang | H01Q 5/378 343/843 |
| 2014/0266972 | A1 * | 9/2014 | Yang | H01Q 9/42 343/893 |
| 2014/0354487 | A1 * | 12/2014 | Liang | H01Q 1/243 343/702 |
| 2015/0155616 | A1 * | 6/2015 | Lin | H01Q 9/42 343/702 |
| 2015/0188213 | A1 * | 7/2015 | Lin | H01Q 1/38 343/702 |
| 2016/0020513 | A1 * | 1/2016 | Ohguchi | H01Q 1/36 343/843 |
| 2016/0056545 | A1 * | 2/2016 | Park | H01Q 9/42 343/893 |
| 2016/0111778 | A1 * | 4/2016 | Zhou | H01Q 1/521 343/841 |
| 2016/0164169 | A1 * | 6/2016 | Krogerus | H01Q 21/28 343/702 |
| 2016/0164177 | A1 * | 6/2016 | Chen | H01Q 1/243 343/843 |
| 2016/0233574 | A1 * | 8/2016 | Xiong | H01Q 1/2258 |
| 2016/0365623 | A1 * | 12/2016 | Kim | H01Q 9/42 |
| 2017/0012341 | A1 * | 1/2017 | Mai | H01Q 1/243 |
| 2017/0047637 | A1 * | 2/2017 | Kim | H04W 4/70 |
| 2017/0048363 | A1 | 2/2017 | Lee et al. | |
| 2017/0117614 | A1 * | 4/2017 | Wu | H01Q 9/42 |
| 2017/0244151 | A1 * | 8/2017 | Han | H01Q 21/30 |
| 2017/0244154 | A1 * | 8/2017 | Chou | H01Q 19/26 |
| 2017/0271765 | A1 * | 9/2017 | An | H01Q 5/335 |
| 2017/0317409 | A1 * | 11/2017 | Ayatollahi | H01Q 21/28 |
| 2017/0338545 | A1 * | 11/2017 | Guo | H01Q 1/44 |
| 2018/0026371 | A1 * | 1/2018 | Chang | H01Q 5/392 343/833 |
| 2018/0062244 | A1 * | 3/2018 | Huang | H01Q 5/371 |
| 2018/0083343 | A1 * | 3/2018 | Choon | H01Q 1/243 |
| 2018/0090822 | A1 * | 3/2018 | Wong | H01Q 1/48 |
| 2018/0152208 | A1 * | 5/2018 | Tsai | H01Q 5/35 |
| 2018/0191057 | A1 * | 7/2018 | Chen | H01Q 1/243 |
| 2018/0205137 | A1 * | 7/2018 | Bonnet | H01Q 9/42 |
| 2018/0219276 | A1 * | 8/2018 | Han | H01Q 5/335 |
| 2018/0233807 | A1 * | 8/2018 | Ma | H01Q 21/0075 |
| 2018/0269581 | A1 * | 9/2018 | Hiraiwa | H01Q 9/42 |
| 2018/0375196 | A1 * | 12/2018 | Han | H01Q 1/243 |
| 2019/0097319 | A1 * | 3/2019 | Hsieh | H01Q 1/243 |
| 2019/0252778 | A1 * | 8/2019 | Duan | H01Q 1/521 |
| 2019/0260126 | A1 * | 8/2019 | Ayala Vazquez | H01Q 9/0485 |
| 2019/0260405 | A1 * | 8/2019 | Son | H01Q 9/0421 |
| 2019/0372215 | A1 * | 12/2019 | Lee | H01Q 5/378 |
| 2020/0052401 | A1 * | 2/2020 | Chang | H01Q 1/48 |
| 2021/0218130 | A1 * | 7/2021 | Chen | H01Q 13/10 |
| 2021/0305703 | A1 * | 9/2021 | Li | H01Q 9/0442 |
| 2022/0209403 | A1 | 6/2022 | Li et al. | |
| 2023/0335922 | A1 * | 10/2023 | Wang | H01Q 25/00 |
| 2024/0072418 | A1 * | 2/2024 | Wu | H04B 1/0064 |
| 2024/0072440 | A1 * | 2/2024 | Wu | H01Q 5/364 |

FOREIGN PATENT DOCUMENTS

| | | | | | |
|---|---|---|---|---|---|
| CN | 106025509 | A | | 10/2016 | |
| CN | 106252829 | A | | 12/2016 | |
| CN | 106450662 | A | | 2/2017 | |
| CN | 107925156 | A | | 4/2018 | |
| CN | 108666741 | A | * | 10/2018 | H01Q 1/242 |
| CN | 108666741 | A | | 10/2018 | |
| CN | 108736130 | A | | 11/2018 | |
| CN | 108767431 | A | * | 11/2018 | H01Q 1/22 |
| CN | 108767431 | A | | 11/2018 | |
| CN | 108808222 | A | | 11/2018 | |
| CN | 108808268 | A | | 11/2018 | |
| CN | 108879112 | A | * | 11/2018 | H01Q 1/242 |
| CN | 108879116 | A | | 11/2018 | |
| CN | 108879116 | A | * | 11/2018 | H01Q 1/2258 |
| CN | 208127429 | U | | 11/2018 | |
| CN | 109346833 | A | | 2/2019 | |
| CN | 109546311 | A | | 3/2019 | |
| CN | 109687105 | A | * | 4/2019 | H01Q 1/243 |
| CN | 109687111 | A | | 4/2019 | |
| CN | 110247160 | A | * | 9/2019 | H01Q 1/241 |
| CN | 110247160 | A | | 9/2019 | |
| CN | 110741506 | B | * | 2/2021 | H01Q 1/243 |
| CN | 112751174 | A | * | 5/2021 | H01Q 1/22 |
| CN | 114335998 | A | * | 4/2022 | |
| EP | 3131156 | A1 | | 2/2017 | |
| GB | 2551212 | A | * | 12/2017 | H01Q 1/2266 |
| JP | 2018157242 | A | | 10/2018 | |
| WO | WO-2017092003 | A1 | * | 6/2017 | H01Q 1/242 |

* cited by examiner

ANTENNA ASSEMBLY AND MOBILE TERMINAL

CROSS-REFERENCE TO RELATED APPLICATIONS

This application is a National Stage of International Application No. PCT/CN2020/086038, filed on Apr. 22, 2020, which claims priority to Chinese Patent Application No. 201910360018.5, filed with the China National Intellectual Property Administration on Apr. 30, 2019 and entitled "ANTENNA ASSEMBLY AND MOBILE TERMINAL", which is incorporated herein by reference in its entirety.

TECHNICAL FIELD

This application relates to the field of mobile terminal technologies, and in particular, to an antenna assembly and a mobile terminal.

BACKGROUND

With rapid development of a mobile terminal technology, a mobile terminal device such as a mobile phone or a tablet computer generally has a plurality of wireless communication capabilities such as cellular communication, wireless fidelity (WiFi) communication, and Bluetooth communication. Therefore, a plurality of antennas or an antenna with a plurality of resonance frequencies needs to be configured for the mobile terminal device, so as to cover a plurality of operating frequency bands for wireless communication. However, at the present stage, under a design trend towards a simple and thin mobile terminal device, net space that can be used by an antenna is increasingly limited, and an operating environment of the antenna becomes worse, resulting in poor isolation between antennas, and affecting performance of the antennas.

SUMMARY

This application provides an antenna assembly and a mobile terminal, so as to improve isolation between antennas and performance of the antennas.

According to a first aspect, an antenna assembly is provided, and the antenna assembly is applied to communication of a mobile terminal. During specific arrangement of the antenna assembly, the antenna assembly includes at least two antennas, for example, the antenna assembly includes a first antenna and a second antenna. The first antenna is a coupled loop antenna, and the second antenna is a loop antenna. During arrangement of the first antenna, the first antenna includes a first feed point and a first radiator connected to the first feed point. Correspondingly, during arrangement of the second antenna, the second antenna includes a second feed point and a second radiator connected to the second feed point. In addition, when the first antenna and the second antenna are arranged on the mobile terminal, there is a specific positional relationship between the radiators of the first antenna and the second antenna. Specifically, a gap is arranged between the first radiator and the second radiator. In addition, an end of the second radiator close to the gap is provided with a first ground wire shared by the first antenna and the second antenna. An end of the second radiator away from the gap is provided with a second ground wire. The antenna assembly further includes a ground. The first ground wire and the second ground wire are separately connected to the ground. During communication, a current of the first radiator is led to the ground through the first ground wire, and a current of the second radiator is led to the ground through the first ground wire and the second ground wire. In addition, when the antennas are in use, the first antenna and the second antenna further excite currents on the ground, and the currents excited by the first antenna and the second antenna on the ground are orthogonally complementary. It can be learned from the foregoing description that, during arrangement of the first antenna and the second antenna, there is only a gap between the ends of the radiators of the first antenna and the second antenna. However, because the currents excited by the first antenna and the second antenna on the ground are orthogonally complementary, crosstalk does not occur on the currents between the first antenna and the second antenna, thereby improving isolation between the first antenna and the second antenna, and ensuring performance of the first antenna and the second antenna during communication.

During specific arrangement of the first radiator, a current path of the first radiator is greater than ⅛ of a wavelength corresponding to an operating frequency band of the first antenna, and less than ½ of the wavelength corresponding to the operating frequency band of the first antenna. More specifically, a length of the first radiator is ¼ of the wavelength corresponding to the operating frequency band of the first antenna.

During specific arrangement of the second radiator, a length of a current path from a connection point between the first ground wire and the second radiator to the end of the second radiator close to the gap is greater than ⅛ of the wavelength corresponding to the operating frequency band of the first antenna, and less than ¼ of the wavelength corresponding to the operating frequency band of the first antenna.

In addition, a length of a current path from the connection point between the first ground wire and the second radiator to a connection point between the second ground wire and the second radiator is greater than ¼ of the wavelength corresponding to the operating frequency band of the second antenna, and less than the wavelength corresponding to the operating frequency band of the second antenna.

During specific arrangement of the first antenna and the second antenna, the first antenna and the second antenna each have at least one operating frequency band. However, during specific arrangement, the first antenna and the second antenna have at least one identical operating frequency band.

During specific arrangement of the first antenna, the first antenna has at least two operating frequency bands. In this case, during arrangement of the first ground wire, the first ground wire is provided with a frequency selective network for filtering the at least two operating frequency bands. Currents corresponding to different operating frequency bands are separately grounded through the arranged frequency selective network.

During specific arrangement of the frequency selective network, when the first antenna has at least two operating frequency bands, the first ground wire includes a first wire and at least two second wires connected in parallel to the first wire. Each second wire is grounded. The frequency selective network includes an LC circuit corresponding to each operating frequency band of the first antenna and the second antenna. A first inductor of each LC circuit is arranged on the first wire, and a first capacitor of each LC circuit is in a one-to-one correspondence with each second wire. The LC circuit is formed by the arranged first inductor and the arranged first capacitor to filter different currents.

In a specific implementable solution, if the first antenna and the second antenna correspondingly have a plurality of operating frequency bands (more than two), the frequency selective network filters operating frequency bands in descending order of sizes of the operating frequency bands and then grounds.

When the first antenna and the second antenna have a plurality of operating frequency bands (more than two), the corresponding frequency selective network is provided with a plurality of LC circuits to filter the currents corresponding to different operating frequency bands. In addition, during specific arrangement, the current corresponding to the operating frequency band filtered by the LC circuit gradually decreases in a direction away from the second radiator.

During specific arrangement of the antenna assembly, in addition to the first antenna and the second antenna, the antenna assembly may further include a third antenna, and an operating frequency band of the third antenna is lower than the operating frequency bands of the first antenna and the second antenna. The third antenna includes a third feed point, and the third feed point is electrically connected to the second radiator through the first ground wire. The first ground wire is provided with a first matching network for passing low frequencies and isolating high frequencies. This further improves a communication effect of the antenna assembly.

During specific arrangement of the foregoing matching network, the first matching network for passing low frequencies and isolating high frequencies includes a second inductor. Certainly, the matching network may further include a plurality of second inductors connected in parallel, and the third feed point can be connected to the second radiator through one of the second inductors selected by using a selection switch.

When the third feed point is connected to the second radiator, the third feed point is specifically connected to the second radiator through the first wire in the first ground wire.

In addition, during specific arrangement of the third antenna, the second feed point is connected to the second radiator through a second feeder, and the second feeder is provided with a second matching network for passing high frequencies and isolating low frequencies. Arrangement of the second matching network for passing high frequencies and isolating low frequencies prevents a current of the third antenna from flowing into the first feed point and the second feed point, and improves isolation among the three antennas.

During specific arrangement of the second matching network, the second matching network for passing high frequencies and isolating low frequencies includes a second capacitor.

During specific arrangement of the first antenna and the second antenna, the currents excited by the first antenna and the second antenna on the ground are orthogonally complementary, thereby improving isolation between antennas.

During specific arrangement of the first antenna and the second antenna, the first antenna is an antenna that can excite a longitudinal current on the ground, and the second antenna is an antenna that can excite a lateral current on the ground. Therefore, the first antenna and the second antenna can generate orthogonally complementary currents, improving isolation between the first antenna and the second antenna.

During arrangement of the second radiator, the second radiator is provided with a setting point for splitting a direction for a current. At the setting point, a part of the current flows in a first direction, and a part of the current flows in a second direction. The first direction is opposite to the second direction.

In a specific implementable solution, the first antenna is an LB/MB/HB antenna, the second antenna is a WiFi antenna, and the third antenna is a GPS antenna.

According to a second aspect, a mobile terminal is provided. The mobile terminal includes a metal frame and the antenna assembly according to any one of the foregoing solutions.

The metal frame includes at least a first metal segment and a second metal segment, and a gap is arranged between the first metal segment and the second metal segment. The first metal segment includes the first radiator, and the second metal segment includes the second radiator.

In the foregoing technical solutions, during arrangement of the first antenna and the second antenna, there is only a gap between the ends of the radiators of the first antenna and the second antenna. However, because the currents excited by the first antenna and the second antenna on the ground are orthogonally complementary, crosstalk does not occur on the currents between the first antenna and the second antenna, thereby improving isolation between the first antenna and the second antenna, and ensuring performance of the first antenna and the second antenna during communication.

DETAILED DESCRIPTION OF ILLUSTRATIVE EMBODIMENTS

To make the objectives, technical solutions, and advantages of this application clearer, the following further describes this application in detail with reference to the accompanying drawings.

To facilitate understanding of an antenna assembly provided in embodiments of this application, the following first describes an application scenarios of the antenna assembly provided in the embodiments of this application. The antenna assembly is applied to a mobile terminal, for example, a common mobile terminal such as a mobile phone, a tablet computer, or a notebook computer. However, with the development of a thinner mobile terminal, a clearance of an antenna is getting smaller, and isolation between antennas is greatly affected, reducing a communication effect of the mobile terminal. Therefore, the embodiments of this application provide the antenna assembly to improve communication performance of the mobile terminal. The following describes in detail the antenna assembly provided in the embodiments of this application with reference to accompanying drawings and specific embodiments.

Figure 1:
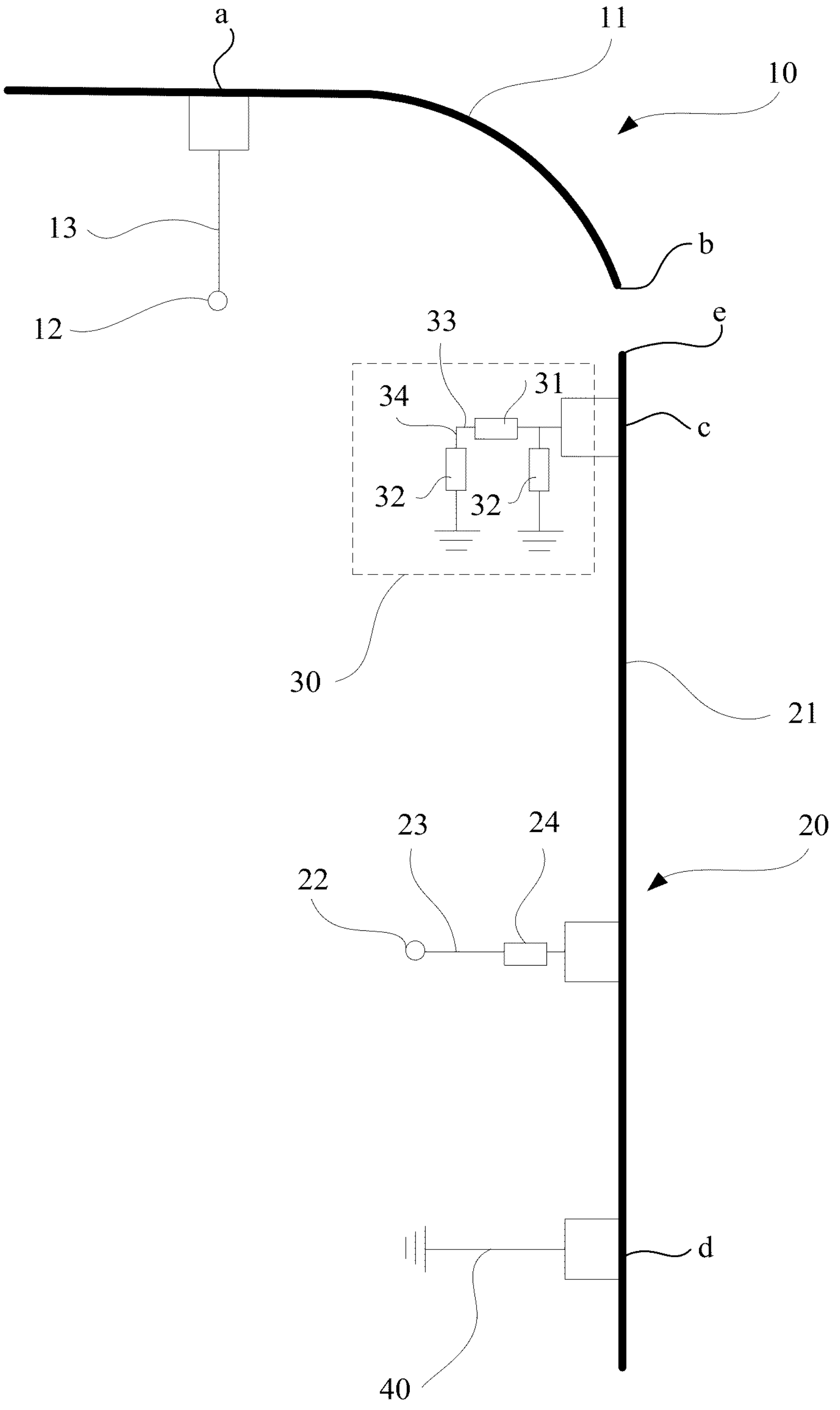
FIG. 1 is a schematic structural diagram of an antenna assembly according to an embodiment of this application.

FIG. 1 shows a structure of an antenna assembly according to an embodiment of this application. As can be seen from FIG. 1, the antenna assembly provided in this embodiment of this application includes a first antenna 10 and a second antenna 20. During specific arrangement of the first antenna 10 and the second antenna 20, the first antenna 10 includes a first feed point 12 and a first radiator 11 connected to the first feed point 12. When the antenna assembly is arranged on a mobile terminal, the first feed point 12 of the first antenna 10 is arranged on a main board of the mobile terminal. The first radiator 11 may be a different conductive structure on the mobile terminal, such as a flexible circuit or a printed metal layer arranged on the main board, or a part of a metal segment on a metal frame of the mobile terminal. In addition, when the first feed point 12 is connected to the first radiator 11, the first feed point 12 is directly electrically connected to the first radiator 11 through a first feeder 13. The first feeder 13 may also use a different structure such as a wire, a flexible circuit, or a printed metal layer to electrically connect the first feed point 12 and the first radiator 11.

During specific arrangement of the first antenna 10, the first antenna 10 is a coupled loop antenna, and a current on the first radiator 11 of the first antenna 10 is coupled to a second radiator 21 of the second antenna 20 through a slot, and is grounded through a first ground wire 30 on the second radiator 21 of the second antenna 20. During specific arrangement of the first radiator 11, a current path length of the first radiator 11 meets a specific length requirement, and a length of the first radiator 11 is greater than ⅛ of a wavelength corresponding to an operating frequency band of the first antenna 10, and less than ½ of the wavelength corresponding to the operating frequency band of the first antenna 10. For example, the current path length of the first radiator 11 includes the length of the current path on the structures listed above when the first feeder 13 is connected to the first radiator 11 through an elastic sheet or LDS (Laser Direct Structuring, laser direct structuring). The current path length of the first radiator 11 is L, and the wavelength corresponding to the operating frequency band of the first antenna 10 is h. Then, ⅛ times h<L<½ times h. During specific arrangement, the length L of the first radiator 11 may be ¼ of the wavelength corresponding to the operating frequency band of the first antenna 10. Alternatively, the length of the first radiator 11 is approximately equal to ¼ of the wavelength corresponding to the operating frequency band of the first antenna 10. The current path length L of the first radiator 11 refers to a length from a connection point a between the first radiator 11 and the first feeder 13 to an end b of the first radiator 11.

Figure 2:
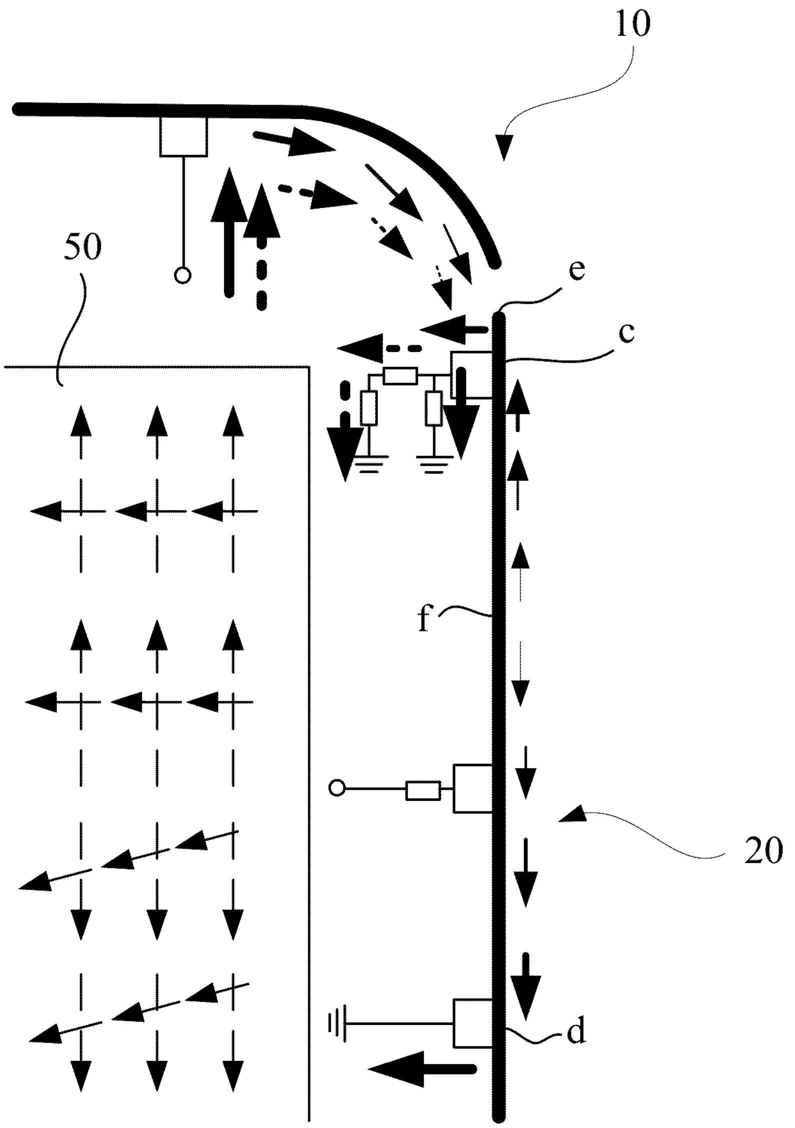
FIG. 2 is a schematic diagram of a current of an antenna assembly according to an embodiment of this application.

During working, the first antenna 10 has at least one operating frequency band, as shown in FIG. 2. FIG. 2 shows a case in which the first antenna 10 has two operating frequency bands, and the two operating frequency bands correspond to different current flows. A solid arrow represents a current flow corresponding to one operating frequency band, and a dashed arrow represents a current flow corresponding to the other operating frequency band. However, regardless of which operating frequency band is used, the current corresponding to the first antenna 10 flows out of the first feed point 12, flows into the first radiator 11 through the first feeder 13, and flows to the ground along the first radiator 11. A thickness of an arrow shown in FIG. 2 indicates a magnitude of the current. It can be seen from FIG. 2 that in the first antenna 10, the current flowing from the first feed point 12 to the first radiator 11 gradually decreases. In addition, during working, the first antenna 10 excites a current on a ground 50, where the ground 50 may be a structure such as a printed circuit board or a middle frame on the mobile terminal. Still referring to FIG. 2, the first antenna 10 can excite a longitudinal current on the ground 50, as indicated by a solid arrow on the ground 50 in FIG. 2. A direction of the current flow is a direction indicated by the arrow shown in FIG. 2. Certainly, it should be understood that the first antenna 10 having two operating frequency bands is a specific example, and the first antenna 10 provided in the embodiments of this application may have other quantities of operating frequency bands, such as three, four, and other different quantities of operating frequency bands.

Still referring to FIG. 1, when the first antenna 10 is grounded, the first antenna 10 and the second antenna 20 share a ground wire, in order to facilitate understanding of the grounding of the first antenna 10 and the second antenna 20. The following describes the second antenna 20. As shown in FIG. 1, the second antenna 20 is a loop antenna, which includes a second feed point 22 and a second radiator 21 connected to the second feed point 22, and further includes two ground wires arranged at both ends of the second radiator 21. When the antenna assembly is arranged on a mobile terminal, the second feed point 22 of the second antenna 20 is arranged on a main board of the mobile terminal. The second radiator 21 may be a different conductive structure on the mobile terminal, such as a flexible circuit or a printed metal layer arranged on the main board, or a part of a metal segment on a metal frame of the mobile terminal. In addition, when the second feed point 22 is connected to the second radiator 21, the second feed point 22 is directly electrically connected to the second radiator 21 through a second feeder 23. The second feeder 23 may also use a different structure such as a wire, a flexible circuit, or a printed metal layer to electrically connect the second feed point 22 and the second radiator 21.

During specific arrangement of the first antenna 10 and the second antenna 20, as shown in FIG. 1, the first antenna 10 and the second antenna 20 are placed adjacent to each other, and there is a gap between the first radiator 11 of the first antenna 10 and the second radiator 21 of the second antenna 20. Still referring to FIG. 1, for ease of describing the two grounds of the second antenna 20, the two ground wires are named a first ground wire 30 and a second ground wire 40, respectively. The first ground wire 30 is a ground wire arranged at an end of the second radiator 21 close to the gap, and the second ground wire 40 is a ground wire arranged at an end away from the gap. The second feeder 23 is arranged between the first ground wire 30 and the second ground wire 40. The first ground wire 30 is a ground wire shared by the first antenna 10 and the second antenna 20. During working, at least a part of the current on the first radiator 11 of the first antenna 10 is coupled to the second radiator 21 and then is grounded through the first ground wire 30 on the second radiator 21. At least a part of the current of the second radiator 21 is also grounded through the first ground wire 30. It can be learned from the foregoing description that the first antenna 10 and the second antenna 20 share the first ground wire 30 for grounding.

During specific arrangement of the second radiator 21, it can be learned from the foregoing description that a section of the second radiator 21 is coupled to the first antenna 10. During specific arrangement, as shown in FIG. 1, the section of the second radiator 21 coupled to the first antenna is a section from a connection point c between the first ground wire 30 and the second radiator 21 to an end e of the second radiator 21 close to the gap. During specific arrangement, a length of a current path from the connection point c between the first ground wire 30 and the second radiator 21 to the end e of the second radiator 21 close to the gap is greater than ⅛ of a wavelength corresponding to an operating frequency band of the first antenna 21, and less than ¼ of the wavelength corresponding to the operating frequency band of the first antenna. Certainly, when the first ground wire 30 is connected to the second radiator 21 through the foregoing elastic sheet and LDS, a length of the elastic sheet and LDS may further be included.

In addition, the current path length of the second radiator 21 further meets a specific length requirement: a length of a current path from the connection point between the first ground wire 30 and the second radiator 21 to a connection point between the second ground wire 40 and the second radiator 21 is greater than ¼ of the wavelength corresponding to the operating frequency band of the second antenna 20, and less than the wavelength corresponding to the operating frequency band of the second antenna 20. The current path length of the second radiator 21 includes the length of the current path on the structures listed above when the second feeder 23 is connected to the second radiator 21 through an elastic sheet or LDS (Laser Direct Structuring, laser direct structuring). The length L1 of the second radiator 21 is a length of a current path from a connection point c between the second radiator 21 and the first ground wire 30 to a connection point d between the second radiator 21 and the second ground wire 40. When the length of the current path between the points c and d on the second radiator 21 is L1, and the wavelength corresponding to the operating frequency band of the second antenna 20 is h1, ¼ times h1<L1<1 times h1. For example, ½ of the wavelength corresponding to the operating frequency band of the second antenna 20 may be used. Alternatively, the length of the second radiator 21 is approximately equal to ½ of the wavelength corresponding to the operating frequency band of the second antenna 20.

It can be learned from the foregoing description that, during arrangement of the second radiator 21, the current path length that needs to be met is as follows: The current path length of the section ce is greater than ⅛ of the wavelength corresponding to the operating frequency band of the first antenna 21, and less than ¼ of the wavelength corresponding to the operating frequency band of the first antenna. The current path length of the segment cd is greater than ¼ of the wavelength corresponding to the operating frequency band of the second antenna 20, and less than the wavelength corresponding to the operating frequency band of the second antenna 20.

During working, the second antenna 20 has at least one operating frequency band, and when the first antenna 10 and the second antenna 20 each have at least one operating frequency band, the first antenna 10 and the second antenna 20 have at least one identical or similar operating frequency band. The so-called similarity means that the operating frequency band of the first antenna 10 differs from the operating frequency band of the second antenna 20 by a specified range.

Still referring to FIG. 2, FIG. 2 shows a case of a current flow when the second antenna 20 has an operating frequency band. In this case, the first antenna 10 and the second antenna 20 have an identical or similar operating frequency band. In the current shown in FIG. 2, a solid arrow represents a current flow corresponding to the operating frequency band. When the second antenna 20 shown in FIG. 2 is working, the current flows out of the second feed point 22 and flows into the second radiator 21 through the second feeder 23, and flows to the two ends of the second radiator 21 on the second radiator 21. The currents flowing to the two ends of the second radiator 21 flow to the ground along the first ground wire 30 and the second ground wire 40, respectively. In addition, the second radiator 21 is provided with a setting point f for splitting a direction for a current. At the setting point, a part of the current flows in a first direction, and a part of the current flows in a second direction. The first direction is opposite to the second direction. For example, the first direction is a direction in which f points to e, and the second direction is a direction in which f points to d. In addition, when the first antenna 10 is working, the first antenna 10 is grounded through the first ground wire 30 after working across the foregoing gap. During specific arrangement of the ground 50, the ground 50 may be a structure such as a printed circuit board or a middle frame on the mobile terminal. In addition, the ground 50 is electrically connected to the first ground wire 30 and the second ground wire 40 separately. In addition, during working, the second antenna 20 excites a current on the ground 50. As shown in FIG. 2, the second antenna 20 can excite a lateral current on the ground 50, as indicated by a dashed arrow on the ground 50 in FIG. 2. A direction of the current flow is a direction indicated by the arrow shown in FIG. 2. It can be seen from the current shown in FIG. 2 that when the first antenna 10 and the second antenna 20 are working, the currents excited by the two antennas on the ground 50 are orthogonally complementary, and there is no crosstalk between the ground currents, thereby improving the isolation of the antennas. Certainly, it should be understood that the second antenna 20 having one operating frequency band is a specific example, and the second antenna 20 provided in the embodiments of this application may have other quantities of operating frequency bands, such as three, four, and other different quantities of operating frequency bands.

When the first antenna 10 and the second antenna 20 have an identical or similar operating frequency band, it can be seen from FIG. 2 that both the first antenna 10 and the second antenna 20 are grounded through the first ground wire 30. In this case, the first antenna 10 and the second antenna 20 simultaneously excite currents on the ground. The first antenna 10 and the second antenna 20 are used to generate orthogonally complementary currents on the ground 50. The first antenna 10 excites a longitudinal current on the ground 50, and the second antenna 20 excites a lateral current on the ground. During specific implementation, the first antenna 10 is a coupled loop antenna, and the second antenna 20 is a loop antenna. For a structure of the first antenna 10 and a structure of the second antenna 20, refer to the foregoing description. It can be learned from the foregoing description that, the ends of the first antenna 10 and the second antenna 20 share a gap, and a distance between the two antennas is relatively short. However, because the currents excited by the first antenna 10 and the second antenna 20 on the ground 50 are orthogonally complementary, and crosstalk does not occur on the currents of the two antennas, there is good isolation between the first antenna 10 and the second antenna 20.

Still referring to FIG. 1 and FIG. 2, when the first antenna 10 has at least two operating frequency bands, to avoid crosstalk on the two currents during grounding, during arrangement of the first ground wire 30, the first ground wire 30 is provided with a frequency selective network for filtering at least two operating frequency bands. Currents corresponding to different operating frequency bands are separately grounded through the frequency selective network arranged on the first ground wire 30. The first antenna 10 and the second antenna 20 shown in FIG. 2 are used as an example. The first antenna 10 has two operating frequency bands, and the second antenna 20 has one operating frequency band. During arrangement of the first ground wire 30, the first ground wire 30 includes a first wire 33 and two second wires 34 connected in parallel to the first wire 33. The two second wires 34 are grounded. The arranged frequency selective network includes: a first inductor 31 arranged on the first wire 33 between the two second wires 34, and first capacitors 32 respectively arranged on the second wires 34. That is, an LC circuit is formed by the arranged first inductor 31 and the arranged first capacitors 32 to filter currents corresponding to different operating frequency bands. As shown in FIG. 2, the first antenna 10 and the second antenna 20 have an identical or similar operating frequency band, and current corresponding to the operating frequency band is a current corresponding to a solid line in FIG. 2. Current of another operating frequency band corresponding to the first antenna 10 is a current corresponding to a dashed line in FIG. 2, and the current represented by the dashed line is smaller than the current represented by the solid line. It can be seen from FIG. 2 that when the two currents are grounded, the current represented by the solid line flows through the first wire 33 and the first capacitor 32 on one of the second wires 34 and then flows into the ground. The second wire 34 is a wire that is close to the second radiator 21 in the arranged second wires 34, that is, a wire through which the current first flows in the direction of the current flow. When the current represented by the dashed line flows through the first ground wire 30, the current is filtered by the first capacitor 32 on the second wire 34 (the second wire 34 through which the current represented by the solid line flows), and then the current is grounded through the first capacitor 32 on the other second wire 34.

Certainly, it should be understood that the foregoing embodiment is described by using an example in which the first antenna 10 has two operating frequency bands, and the second antenna 20 has one operating frequency band. The first antenna 10 and the second antenna 20 provided in the embodiments of this application may each have two or more operating frequency bands. When the foregoing operating frequency bands are different, the corresponding frequency selective network includes an LC circuit corresponding to each operating frequency band of the first antenna 10 and the second antenna 20. A first inductor 31 of each LC circuit is arranged on the first wire 33, and a first capacitor 32 of each LC circuit is in a one-to-one correspondence with each second wire 34, a plurality of LC circuits are arranged to filter the currents corresponding to different operating frequency bands. During specific filtering, the frequency selective network can perform sequential filtering in descending order of sizes of the operating frequency bands. During specific implementation, filtering is also performed by using the foregoing LC circuit. Second wires 34 corresponding to unequal operating frequency bands are sequentially arranged on the first wire 33, and a first inductor 31 is arranged between any two second wires 34. In addition, in the direction away from the second radiator 21, a capacitance value of the first capacitor 32 arranged on the second wire 34 gradually decreases. In this way, currents corresponding to different operating frequency bands can be sequentially grounded through the arranged frequency selective network.

Figure 3:
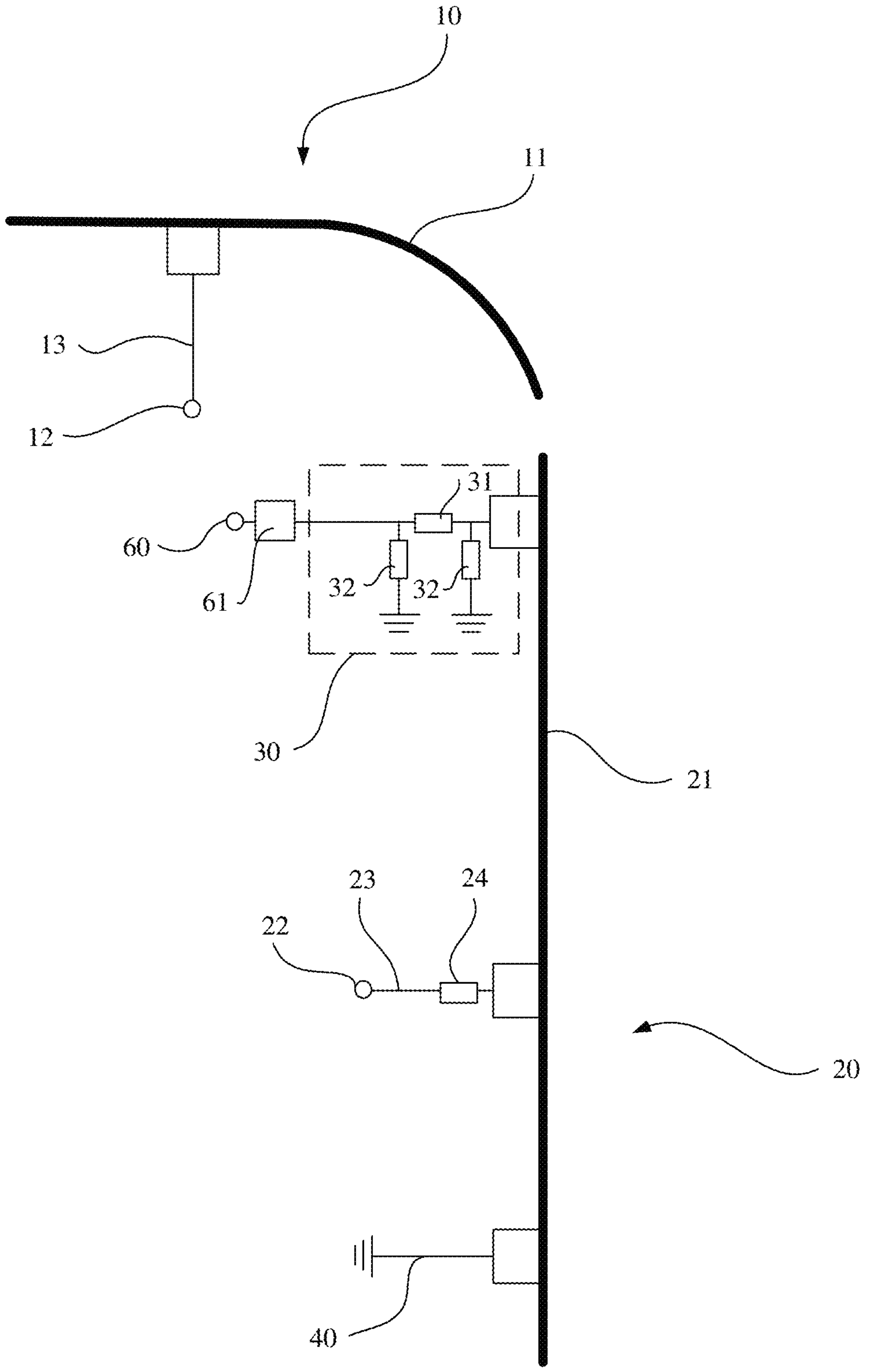
FIG. 3 is another schematic structural diagram of an antenna assembly according to an embodiment of this application.

FIG. 3 is another schematic structural diagram of an antenna assembly according to an embodiment of this application. In the structure shown in FIG. 3, in addition to the first antenna 10 and the second antenna 20, the antenna assembly may further include a third antenna. During arrangement of the third antenna, an operating frequency band of the third antenna is lower than the operating frequency bands of the first antenna 10 and the second antenna 20.

For example, the operating frequency bands of the first antenna 10 and the second antenna 20 are between 2.4 GHz and 2.5 GHz, such as 2.4 GHz and 2.5 GHz. The operating frequency band of the third antenna is 1.575 GHz or 700 MHz to 960 MHz. Still referring to FIG. 3, the third antenna includes a third feed point 60 and a radiator connected to the third feed point **6*o*. The third antenna and the second antenna 20 share a radiator, that is, the radiator of the third antenna is the second radiator 21 described above. When the third feed point 60 is electrically connected to the second radiator 21, as shown in FIG. 3, the third feed point 60 is electrically connected to the second radiator 21 through the first ground wire 30. It can be learned from the foregoing description that the currents of the first antenna 10 and the second antenna 20 flow through the first ground wire 30. Therefore, when the third feed point 60 is connected to the first ground wire 30, the first ground wire 30 is provided with a first matching network 61** for passing low frequencies and isolating high frequencies.

Still referring to FIG. 3, during specific arrangement of the first matching network 61 for passing low frequencies and isolating high frequencies, as shown in FIG. 3, the third feed point 60 is electrically connected to the first wire 33, and the first matching network 61 for passing low frequencies and isolating high frequencies is arranged on the first wire 33, and an arrangement location of the first matching network 61 for passing low frequencies and isolating high frequencies is between the third feed point 60 and the nearest second wire 34. When the currents of the first antenna 10 and the second antenna 20 are grounded, arrangement of the first matching network 61 for passing low frequencies and isolating high frequencies can prevent the currents of the first antenna 10 and the second antenna 20 from flowing into the third feed point **6*o*. When the current of the third feed point 60 flows through the first wire 33, the first capacitor 32 arranged on the second wire 34 can block the current corresponding to the low operating frequency band input by the third feed point 60, so that the current input by the third feed point 60 can flow into the second radiator 21**.

During specific arrangement of the first matching network 61, the first matching network 61 may be in different forms, such as including a second inductor, or a plurality of second inductors connected in series, or a circuit formed by a second inductor and a capacitor. In addition, the matching network 61 may further include a plurality of second inductors connected in parallel, and the third feed point 60 can be connected to the second radiator 21 through one of the second inductors selected by using a selection switch, thereby implementing the frequency selection function.

It can be learned from the foregoing description that, during working, the third antenna uses the second radiator 21 of the second antenna 20. To prevent the current of the third antenna from flowing into the second feed point 22, during specific arrangement of the second feeder 23, the second feed point 22 is connected to the second radiator 21 through the second feeder 23, and the second feeder 23 is provided with a second matching network 24 for passing high frequencies and isolating low frequencies. During specific arrangement, the second matching network 24 for passing high frequencies and isolating low frequencies may include different electrical components. For example, the second matching network 24 includes a second capacitor, or the second matching network 24 may further include a plurality of second capacitors connected in parallel, and the third feed point 60 can be connected to the second radiator 21 through one of the second capacitors selected by using a selection switch, thereby implementing the frequency selection function.

Arrangement of the second matching network 24 for passing high frequencies and isolating low frequencies enables the current output by the second feed point 22 to feed to the second radiator 21 while preventing the current fed by the third feed point 60 to the second radiator 21 from flowing into the second feed point 22, thereby improving the isolation between the second antenna 20 and the third antenna.

Figure 4:
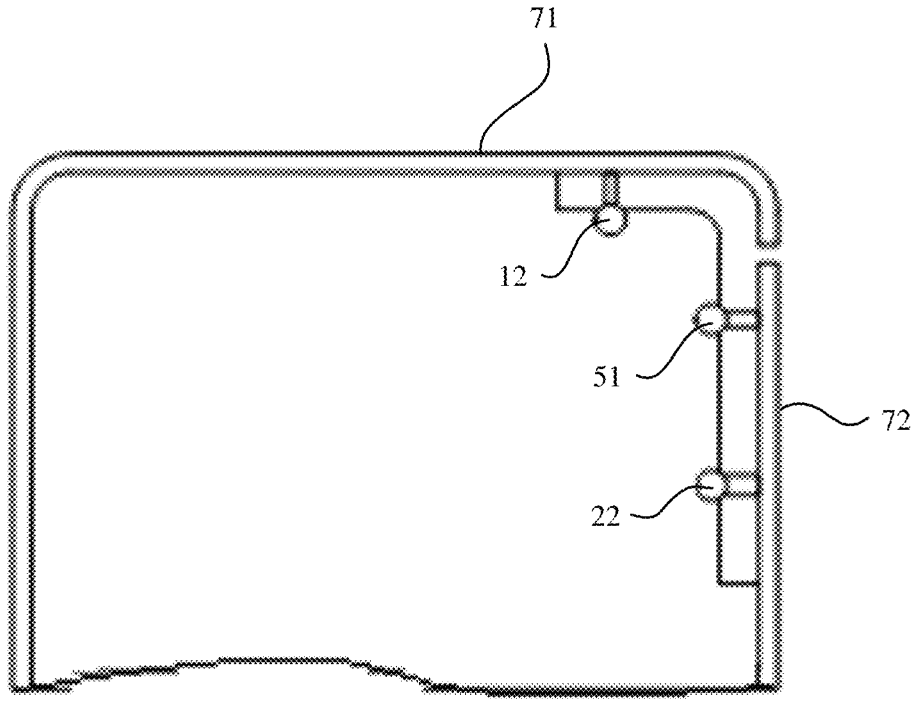
FIG. 4 is a schematic diagram of an antenna assembly in a mobile terminal according to an embodiment of this application.
Figure 5:
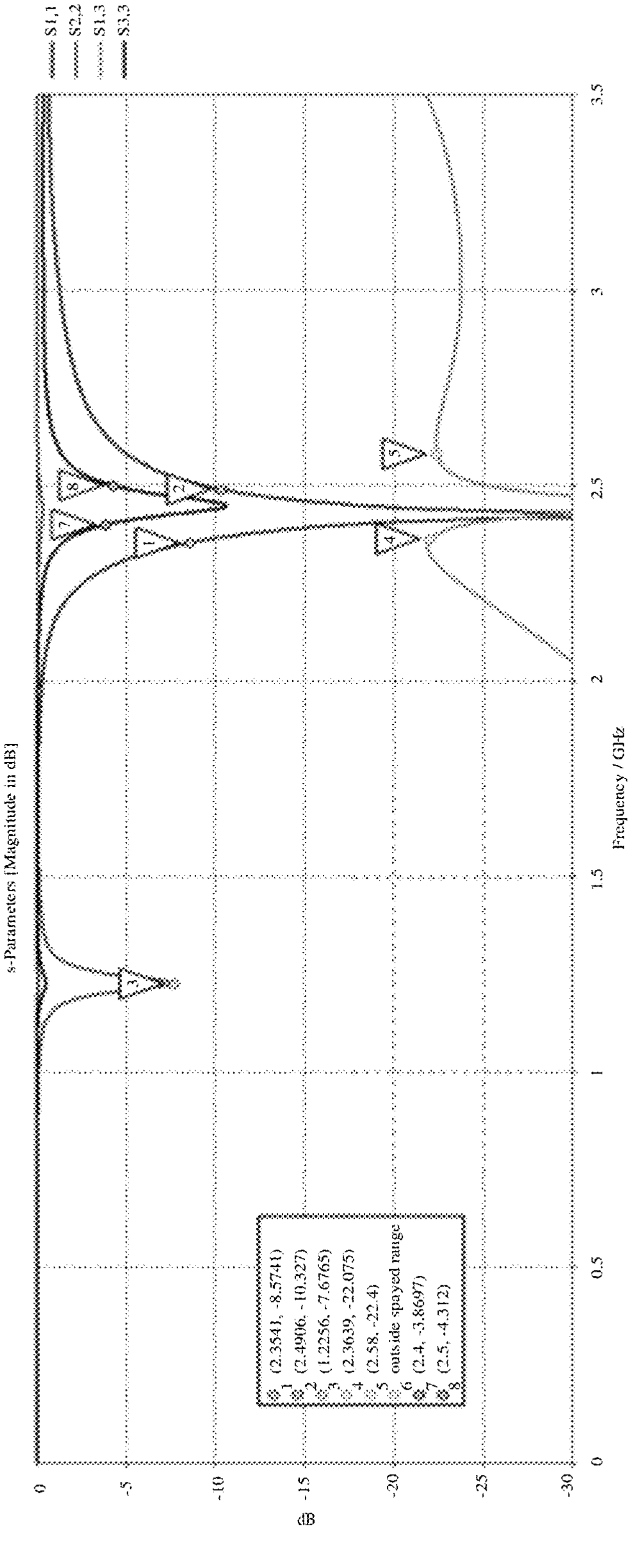
FIG. 5 is a schematic diagram of standing wave simulation for an antenna assembly according to an embodiment of this application.
Figure 6:
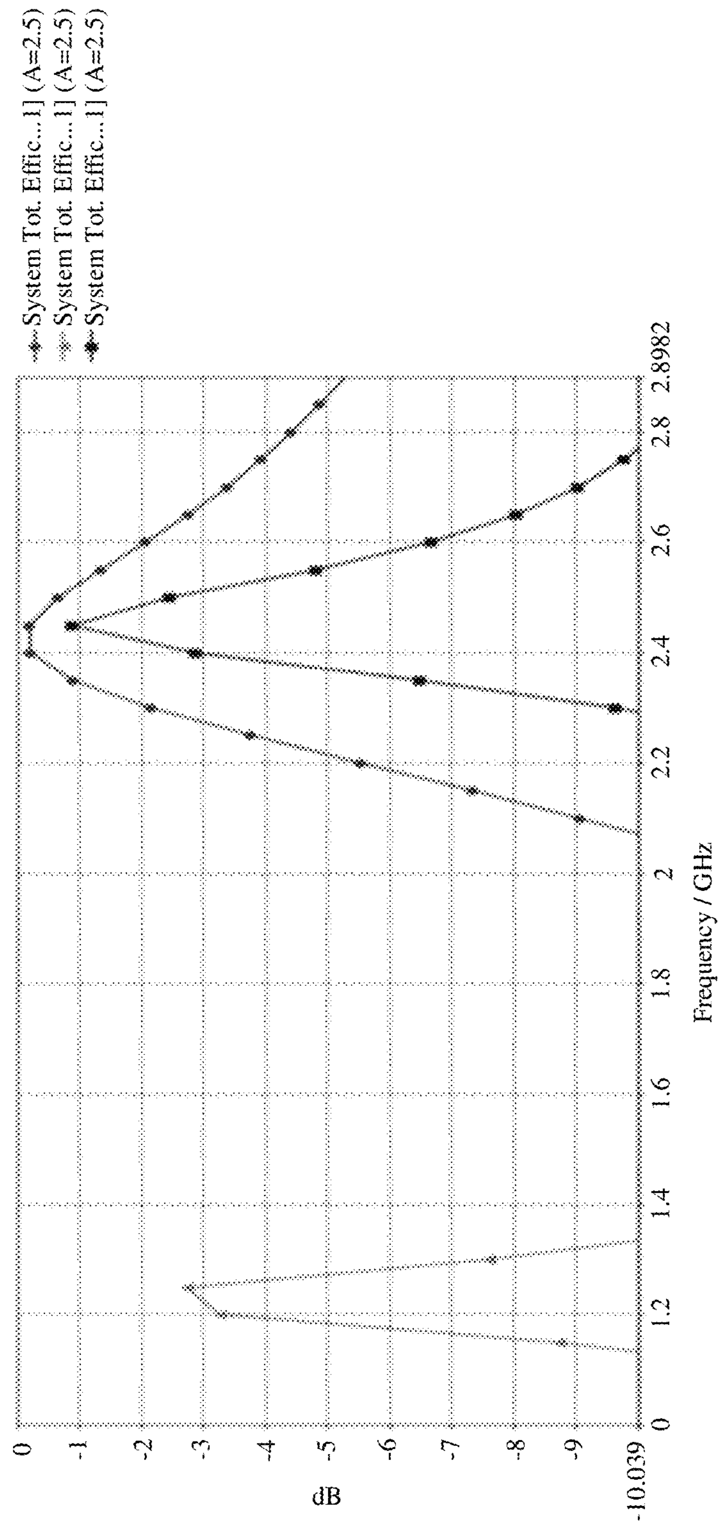
FIG. 6 is a schematic diagram of efficiency simulation for an antenna assembly according to an embodiment of this application.
Figure 7:
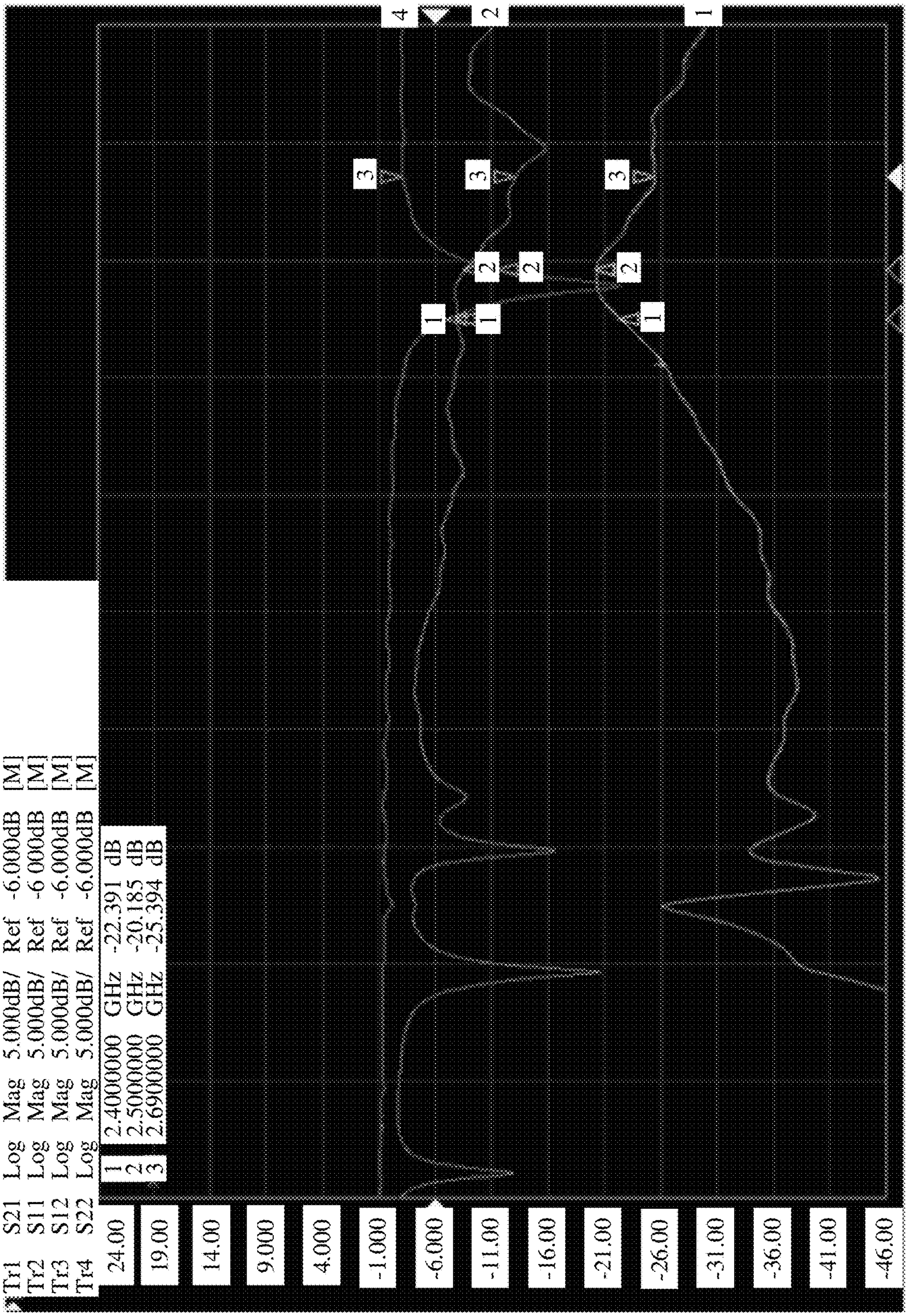
FIG. 7 is a debugging diagram of isolation between a first antenna and a second antenna according to an embodiment of this application.
Figure 8:
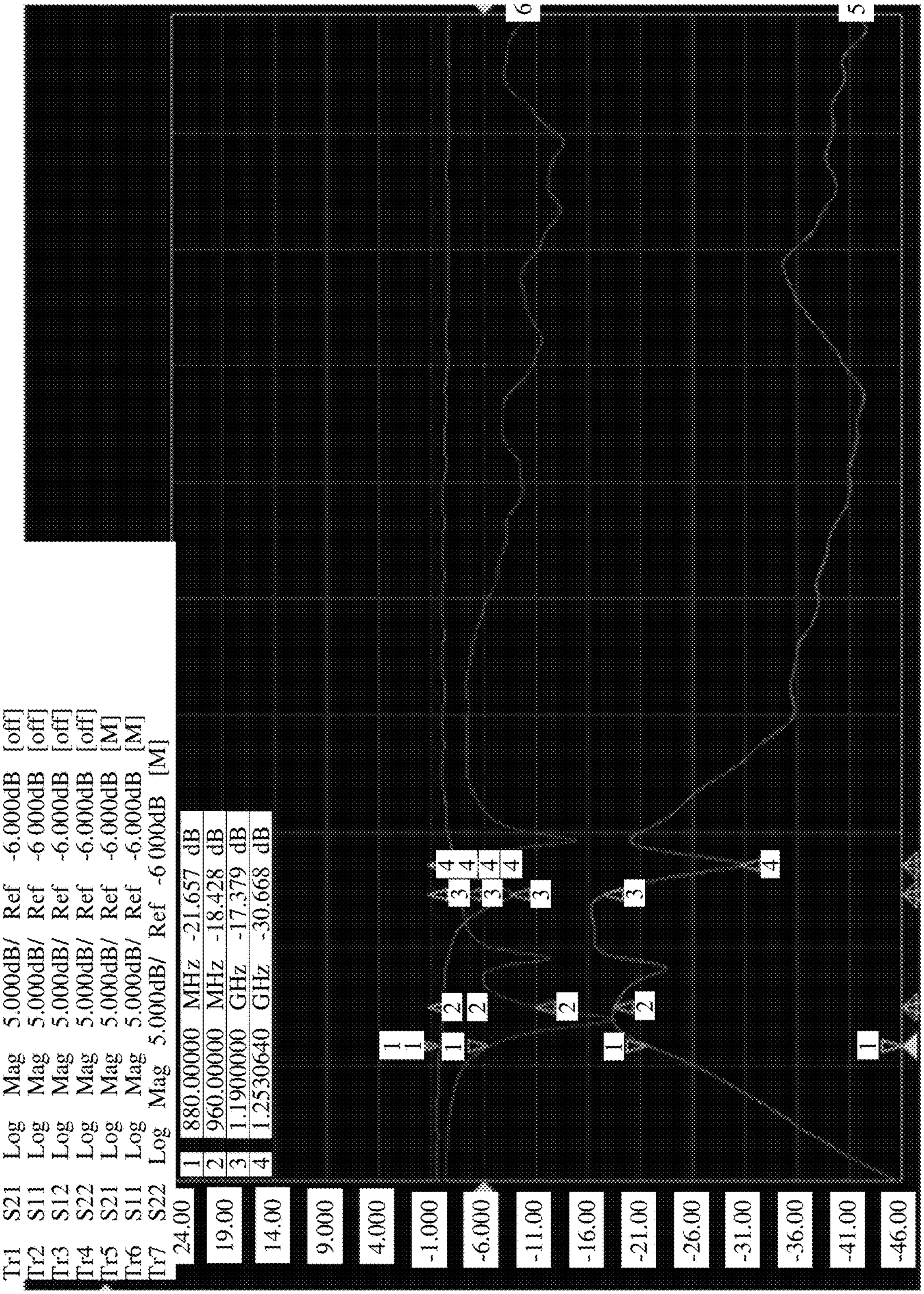
FIG. 8 is a debugging diagram of isolation between a first antenna and a third antenna according to an embodiment of this application.

To facilitate the understanding of the antenna assembly provided in the embodiments of this application, the antenna assembly is simulated by using an example in which the antenna assembly includes the first antenna 10, the second antenna 20, and the third antenna, so as to describe isolation among the three antennas. The radiators of the first antenna 10, the second antenna 20, and the third antenna use the structure on the metal frame of the mobile terminal. Specifically, referring to FIG. 4, the metal frame includes at least a first metal segment 71 and a second metal segment 72, and a gap is arranged between the first metal segment 71 and the second metal segment 72. The first radiator 11 includes the first metal segment 71 and the second radiator 21 includes the second metal segment 72. Overall size of the mobile terminal: 75 mm*155 mm*7.5 mm; plastic parameters: a dielectric constant 3.5 and a loss angle tangent 0.0037. The first antenna 10 is an LB/MB/HB antenna, the second antenna 20 is a WiFi antenna, and the third antenna is a GPS antenna. The simulation results are shown in FIG. 5 and FIG. 6. FIG. 5 shows the standing wave simulation effects of the first antenna 10, the second antenna 20, and the third antenna. The curve in which the marking points 7 and 8 are located is a simulation curve of the second antenna. The curve in which the marking points 1 and 2 are located is a simulation curve of the first antenna. The curve in which the marking point 3 is located is a simulation curve of the third antenna. FIG. 6 shows the efficiency of each antenna. It can be seen from FIG. 5 and FIG. 6 that there are good isolation and good communication effects among the three antennas. The antenna shown in FIG. 4 is debugged. As shown in FIG. 7 and FIG. 8, the isolation between the second antenna 20 and the first antenna can reach 20 dB or less, and the isolation between the third antenna and the first antenna 10 is below −16 dB.

In addition, an embodiment of this application further provides a mobile terminal. The mobile terminal includes a metal frame and the antenna assembly according to any one of the foregoing aspects. The metal frame includes at least a first metal segment 71 and a second metal segment 72, and a gap is arranged between the first metal segment 71 and the second metal segment 72. The first metal segment 71 is the first radiator 11, and the second metal segment 72 is the second radiator 21. In the foregoing technical solutions, during arrangement of the first antenna 10 and the second antenna 20, there is only a gap between the ends of the radiators of the first antenna and the second antenna. However, because the currents excited by the first antenna 10 and the second antenna 20 on the ground are orthogonally complementary, when the currents are led to the ground through the ground wire, the current excited by the first antenna 10 on the ground does not flow into the second feed point, and likewise, the current excited by the second antenna 20 on the ground does not flow into the first feed point. Therefore, crosstalk does not occur on the currents between the first antenna 10 and the second antenna 20, thereby improving isolation between the first antenna 10 and the second antenna 20, and ensuring performance of the first antenna 10 and the second antenna 20 during communication.

Clearly, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. An antenna assembly, applied to a mobile terminal, wherein the antenna assembly comprises:

a first antenna; and a second antenna;

wherein the first antenna comprises a first feed point and a first radiator connected to the first feed point;

wherein the second antenna comprises a second feed point and a second radiator connected to the second feed point, wherein a gap is arranged between the first radiator and the second radiator, an end of the second radiator close to the gap is provided with a first ground wire shared by the first antenna and the second antenna, and an end of the second radiator away from the gap is provided with a second ground wire; and wherein the first ground wire and the second ground wire are separately connected to ground.

2. The antenna assembly according to claim 1, wherein a current path length of the first radiator is greater than ⅛ of a wavelength corresponding to an operating frequency band of the first antenna, and less than ½ of the wavelength corresponding to the operating frequency band of the first antenna.

3. The antenna assembly according to claim 1, wherein a length of a current path from a connection point between the first ground wire and the second radiator to the end of the second radiator close to the gap is greater than ⅛ of a wavelength corresponding to an operating frequency band of the first antenna, and less than ¼ of the wavelength corresponding to the operating frequency band of the first antenna.

4. The antenna assembly according to claim 1, wherein a length of a current path from a connection point between the first ground wire and the second radiator to a connection point between the second ground wire and the second radiator is greater than ¼ of a wavelength corresponding to an operating frequency band of the second antenna, and less than the wavelength corresponding to the operating frequency band of the second antenna.

5. The antenna assembly according to claim 1, wherein the first antenna and the second antenna have at least one identical operating frequency band.

6. The antenna assembly according to claim 1, wherein the first antenna has at least two operating frequency bands, and the first ground wire is provided with a frequency selective network for filtering the at least two operating frequency bands.

7. The antenna assembly according to claim 6, wherein:

the first ground wire comprises a first wire and at least two second wires connected in parallel to the first wire;

each second wire of the at least two second wires is grounded;

the frequency selective network comprises a plurality of LC circuits, wherein each LC circuit of the plurality of LC circuits corresponds to an operating frequency band of the at least two operating frequency bands of the first antenna; and a first inductor of each LC circuit of the plurality of LC circuits is arranged on the first wire, and a first capacitor of each LC circuit of the plurality of LC circuits corresponds to each second wire.

8. The antenna assembly according to claim 1, wherein:

the antenna assembly further comprises a third antenna, and an operating frequency band of the third antenna is lower than operating frequency bands of the first antenna and the second antenna; and the third antenna comprises a third feed point, and the third feed point is electrically connected to the second radiator through the first ground wire, and the first ground wire is provided with a first matching network for passing low frequencies and isolating high frequencies.

9. The antenna assembly according to claim 8, wherein the first matching network for passing low frequencies and isolating high frequencies comprises a second inductor.

10. The antenna assembly according to claim 1, wherein the second feed point is connected to the second radiator through a second feeder, and the second feeder is provided with a second matching network for passing high frequencies and isolating low frequencies.

11. The antenna assembly according to claim 10, wherein the second matching network for passing high frequencies and isolating low frequencies comprises a second capacitor.

12. The antenna assembly according to claim 1, wherein:

the second radiator is provided with a setting point for splitting a direction for a current; and at the setting point, a part of the current flows in a first direction and a part of the current flows in a second direction, wherein the first direction is opposite to the second direction.

13. The antenna assembly according to claim 1, wherein currents excited by the first antenna and the second antenna on the ground are orthogonally complementary.

14. The antenna assembly according to claim 13, wherein the first antenna can excite a longitudinal current on the ground, and the second antenna can excite a lateral current on the ground.

15. A mobile terminal, comprising:

a metal frame; and an antenna assembly, wherein the antenna assembly comprises a first antenna and a second antenna;

wherein the first antenna comprises a first feed point and a first radiator connected to the first feed point;

wherein the second antenna comprises a second feed point and a second radiator connected to the second feed point, wherein a gap is arranged between the first radiator and the second radiator, an end of the second radiator close to the gap is provided with a first ground wire shared by the first antenna and the second antenna, and an end of the second radiator away from the gap is provided with a second ground wire;

wherein the first ground wire and the second ground wire are separately connected to ground;

wherein the metal frame comprises a first metal segment and a second metal segment, and a gap is arranged between the first metal segment and the second metal segment; and wherein the first radiator comprises the first metal segment, and the second radiator comprises the second metal segment.

16. The mobile terminal according to claim 15, wherein a current path length of the first radiator is greater than ⅛ of a wavelength corresponding to an operating frequency band of the first antenna, and less than ½ of the wavelength corresponding to the operating frequency band of the first antenna.

17. The mobile terminal according to claim 15, wherein a length of a current path from a connection point between the first ground wire and the second radiator to the end of the second radiator close to the gap is greater than ⅛ of a wavelength corresponding to an operating frequency band of the first antenna, and less than ¼ of the wavelength corresponding to the operating frequency band of the first antenna.

18. The mobile terminal according to claim 15, wherein a length of a current path from a connection point between the first ground wire and the second radiator to a connection point between the second ground wire and the second radiator is greater than ¼ of a wavelength corresponding to an operating frequency band of the second antenna, and less than the wavelength corresponding to the operating frequency band of the second antenna.

19. The mobile terminal according to claim 15, wherein the first antenna and the second antenna have at least one identical operating frequency band.

20. The mobile terminal according to claim 15, wherein currents excited by the first antenna and the second antenna on the ground are orthogonally complementary.

21. The mobile terminal according to claim 20, wherein the first antenna can excite a longitudinal current on the ground, and the second antenna can excite a lateral current on the ground.

* * * * *